United States Patent
Zeisner et al.

[11] Patent Number: 5,495,657
[45] Date of Patent: Mar. 5, 1996

[54] METHOD FOR PRODUCING A COMMUTATOR MOTOR

[75] Inventors: Pius Zeisner, Arnstein; Peter Adam, Hoechberg, both of Germany

[73] Assignee: Siemens Aktiengesellschaft, Germany

[21] Appl. No.: 278,305

[22] Filed: Jul. 21, 1994

[30] Foreign Application Priority Data

Apr. 8, 1994 [EP] European Pat. Off. ............. 94105474

[51] Int. Cl.$^6$ .................................................. H02K 15/14
[52] U.S. Cl. .................. 29/597; 29/598; 29/733
[58] Field of Search ................ 29/597, 598, 732, 29/733, 450; 310/42, 239–242, 245, 247

[56] References Cited

U.S. PATENT DOCUMENTS

| | | | |
|---|---|---|---|
| 3,001,271 | 9/1961 | Perrin | 29/283 |
| 3,875,640 | 4/1975 | Perrin et al. | 29/733 X |
| 4,617,486 | 10/1986 | Miyauchi | 310/233 |
| 4,694,214 | 9/1987 | Stewart | 310/239 |
| 4,774,754 | 10/1988 | Stewart | 29/596 |
| 5,172,465 | 12/1992 | Stewart, Sr. | 29/597 |

FOREIGN PATENT DOCUMENTS

| | | | |
|---|---|---|---|
| 0236254 | 2/1987 | European Pat. Off. | ........ H01R 39/38 |
| 31092 | 5/1956 | Germany . | |
| 3533307 | 9/1985 | Germany . | |
| 5-003646 | 1/1993 | Japan . | |

*Primary Examiner*—Carl E. Hall
*Attorney, Agent, or Firm*—Russel C. Wells

[57] ABSTRACT

In the case of assembly after the insertion of the rotor (4–7) with the commutator (4) into the motor housing (8), in order to be able to install the brush holder (1), with its brushes (1.1; 1.2) which are subject to radial spring pressure, simply and in a manner which can be carried out by an automated machine it is proposed that: the brush holder (1) is pushed onto one end part (2.1) of an installation mandrel (2) which is in the form of a sleeve and whose other end (2.3) is placed on the commutator (4), together with an integrated restraining part (3) which holds the brushes (1.1; 1.2) in a raised installation position; and that the restraining part (3) is fixed outside the motor housing (8) by means of a conical expansion of one end part (2.1). The brush holder (1) is then moved into its final position with the brushes (1.1; 1.2) which now slide on the installation mandrel (2). The brushes (1.1; 1.2) are pressed radially onto the commutator (4) during the withdrawal of the installation mandrel (2).

12 Claims, 5 Drawing Sheets

METHOD FOR PRODUCING A COMMUTATOR MOTOR

The invention relates to a method for producing a commutator motor.

Methods and devices for the installation of a brush holder with a restraining part, which is preinstalled therein, for fixing the brushes in a radially raised installation position are disclosed by DE-A1-B31092 VIII b/21d[1] and EP-B1-0 236 254 and their priority-establishing U.S. Pat. Nos. 4,694,214 and 4,774,754.

In the case of the abovementioned German Patent Application, a restraining disk which radially raises the brushes in a preinstalled position is held in a preinstalled manner in the brush holder, axially guided in such a manner that during assembly of the commutator motor, preferably during the insertion of the rotor into the preinstalled stator part, it is displaced axially by the commutator which presses on at the end, and in consequence releases the brushes.

In the case of EP-B1-0 236 254, a restraining disk is injection molded in a preinstalled manner on the brush holder by means of radial webs, in such a manner that, during the installation of the rotor into the stator housing, the webs break off by axially pressing the commutator against the restraining disk and the restraining disk is displaced axially or falls into the motor housing as debris, and in such a manner that the brushes are released into their final operating position.

In both of the abovementioned cases, an axial movement of the preinstalled rotor relative to the brushes is necessary in order to release the brushes, in such a manner that, after being released, they must be moved still further axially out of their installation holder and their first making of contact with the commutator surface; in consequence, there is a risk of the sliding surfaces of the brushes being damaged, which damage can endanger correct, preferably low-noise, operation. Since the restraining part remains inside the motor in both of the abovementioned known cases, once the brushes have been released, it is necessary to ensure that the restraining part is guided in a deliberate manner into a final position or that the restraining part, which is broken into debris when the brushes are released, is safely disposed of.

A method, which is considerably simpler and more reliable in operation in comparison, for producing a commutator motor having a brush holder with a preinstalled restraining part is possible according to the invention; advantageous refinements of the invention are in each case the subject matter of the subclaims.

As a result of the use according to the invention of an installation mandrel, it is possible on the one hand to achieve the removal of the restraining part from its installation position to the outside of the motor housing in a manner which is favorable in terms of installation and is advantageous for reliable continuous operation of the motor, and, on the other hand, without additional axial movement between the commutator and the brushes which, after removal of the restraining part from its installation position, rest on the commutator surface.

The removal of the restraining part from its installation position by means of the outer end part of the installation mandrel which is provided according to the invention can be carried out either outside the actual installation device of the commutator motor or with the installation mandrel already centered on the commutator, by means of its other end, which is in the form of a sleeve; in the latter case, according to a first refinement of the invention, the end of the installation mandrel on the motor side can rest axially against the commutator, preferably against its bent commutator hook, for axial support between the installation mandrel and the rotor, or, according to a further refinement, its other end can rest axially, preferably internally, against the rotor shaft.

The invention and further advantageous refinements of the invention according to features of the subclaims are explained in more detail in the following text, with reference to a schematically illustrated exemplary embodiment in the drawing, in which:

Figure 1:
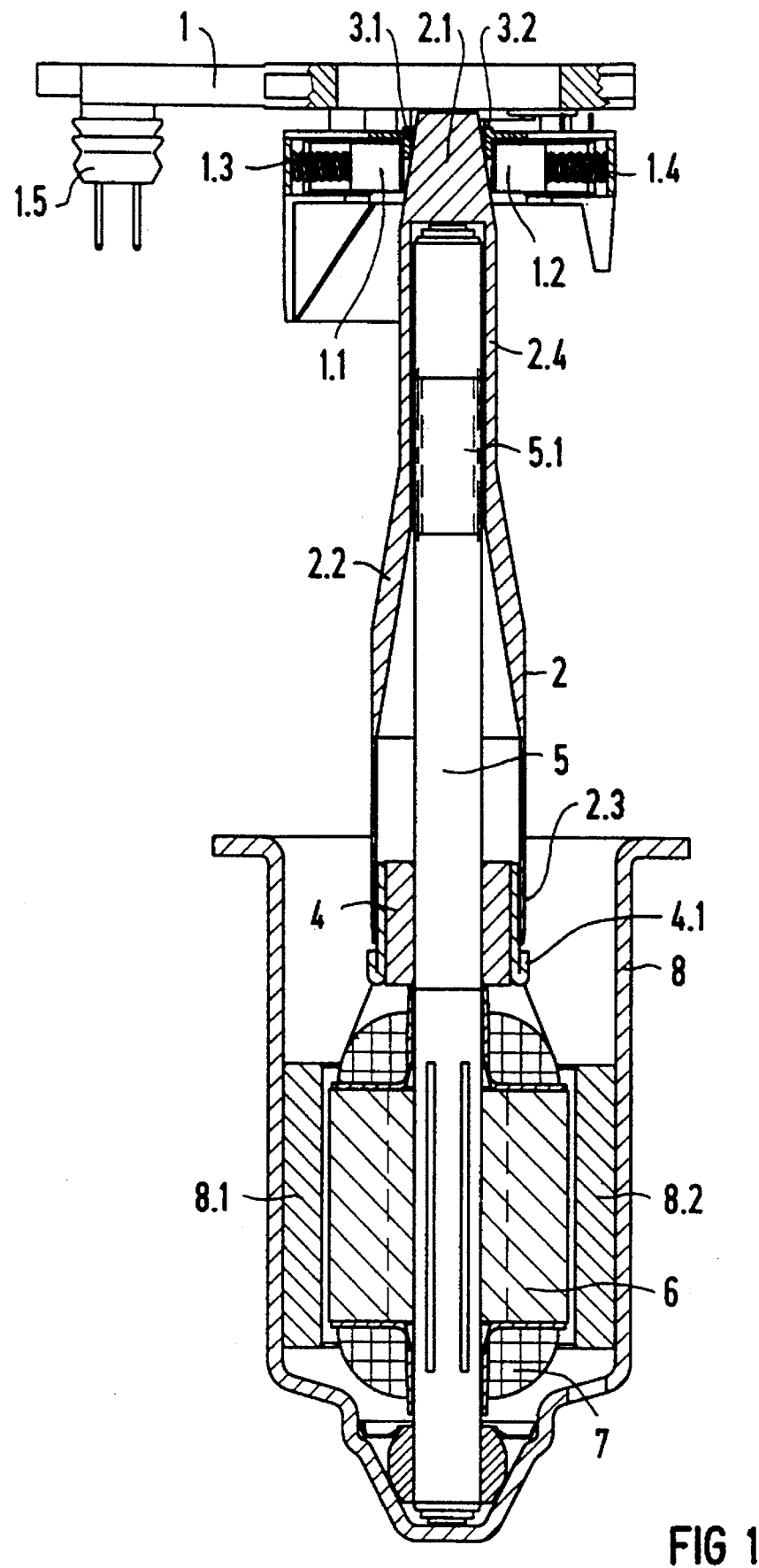
FIGS. 1 to 4 show, in an axial longitudinal section in each case, four successive method steps for fitting a brush holder having a preinstalled restraining part into its operating position relative to the stator housing, which is already preinstalled with the rotor inserted.

Using axial assembly, a rotor having a rotor shaft 5 with a rotor core 6, which is held thereon, and a commutator 4, and having a rotor winding 7 which is fitted into the rotor winding and is connected to the hooks of the laminates of the commutator 4 is inserted axially, as far as its final operating position, into a motor housing 8, which is still open at its end on the commutator side and has exciter magnets 8.1; 8.2 which are held on its internell circumferential side.

Figure 4:
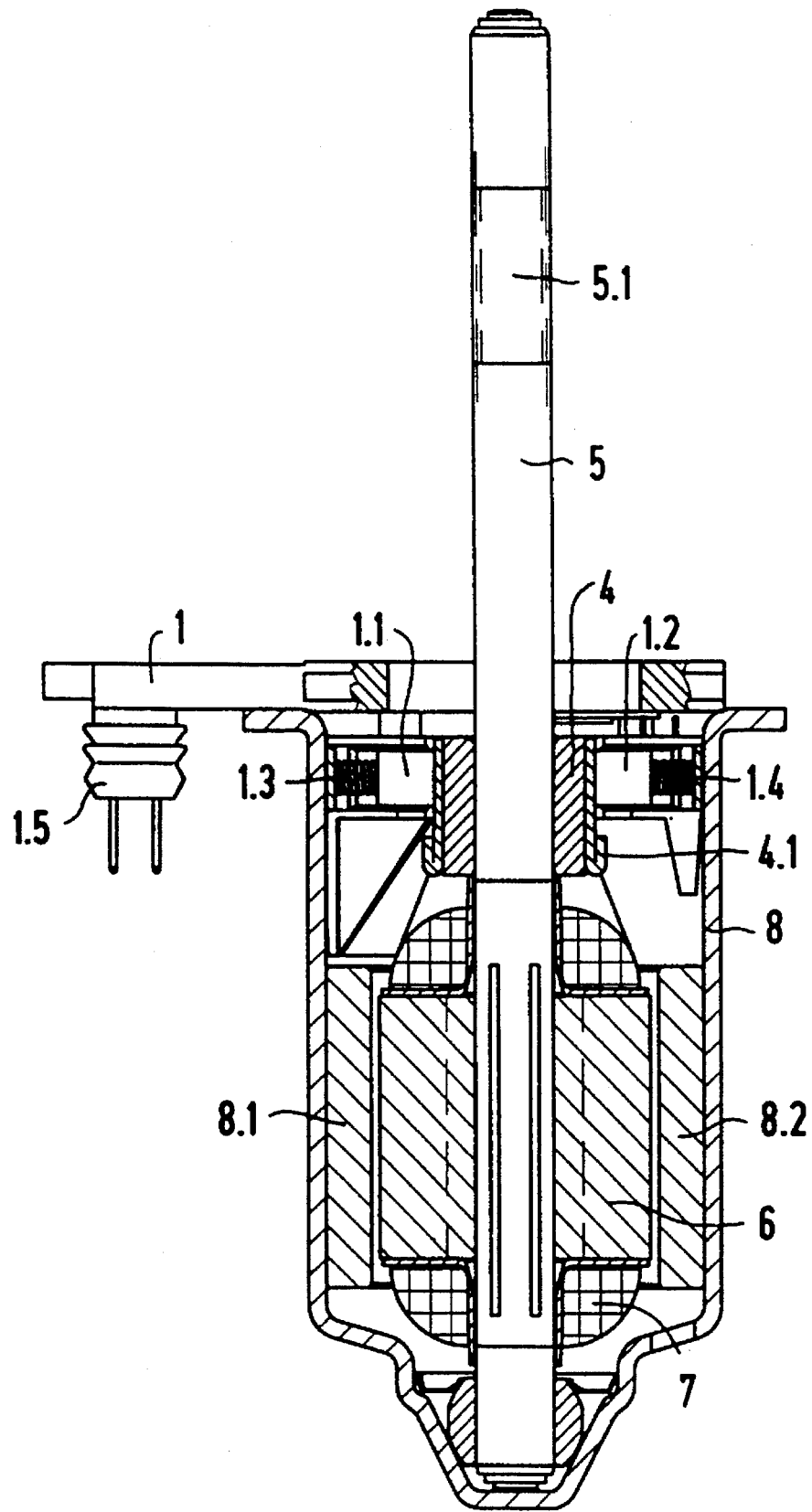
Figure 5:
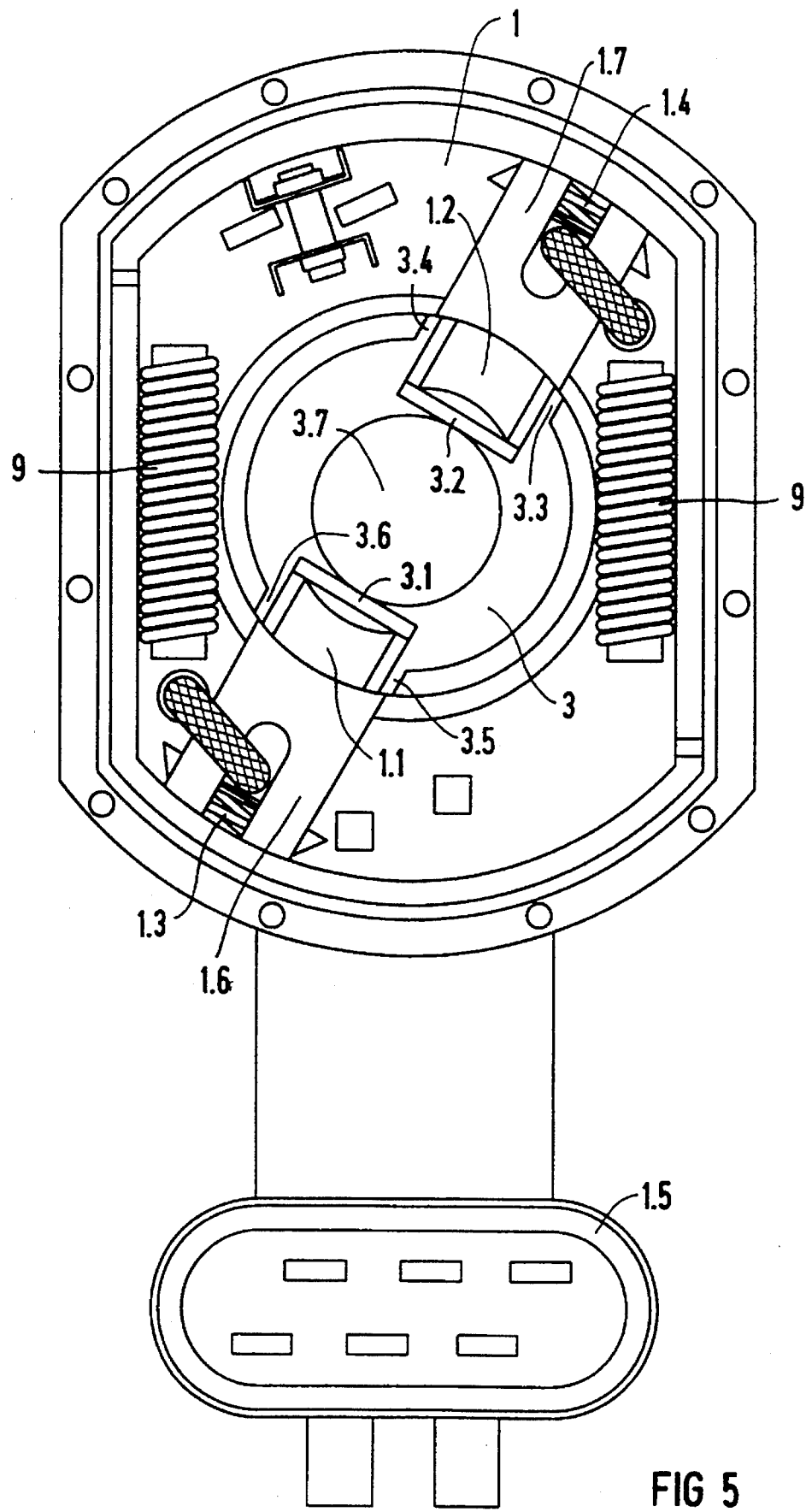
FIG. 5 shows an end plan view of the brush holder with a preinstalled restraining part.

A plastic brush holder 1 having an external connecting plug 1.5, having suppression inductors 9; 9 and preferably having brushes 1.1; 1.2 which are guided in brush boxes and are pressed radially inwards by brush contact-pressure springs 1.3; 1.4 is moved out of an initial installation position, according to FIG. 1, into a final operating position, according to FIG. 4, with the aid of the installation mandrel 2 according to the invention.

In the present exemplary embodiment, the commutator 4 is provided as the drive of a geared motor, preferably for window winder drives and sliding-roof drives in motor vehicles; for this purpose, a gearbox housing, which is not illustrated here, is flange-connected to the open end of the motor housing 8, which is in the form of a pot, by means of a worm drive whose worm gear is driven by a drive shaft 5.1 which, in the illustrated exemplary embodiments, forms an integral extension of the rotor shaft 5.

Figure 3:
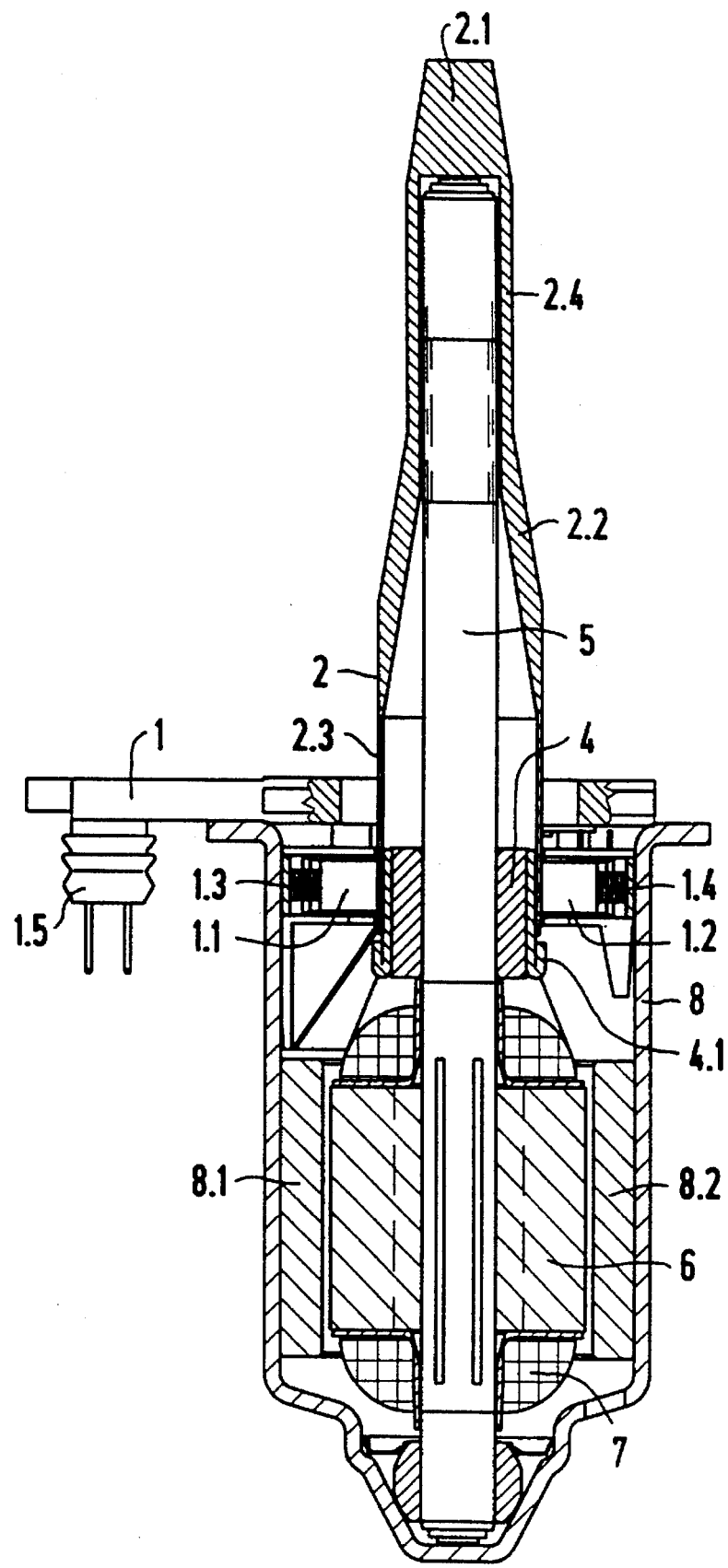

According to a :refinement of the invention, the installation mandrel 2 is provided in the form of a sleeve with an internal hole in such a manner that, on the one hand, the outer end of the drive shaft 5.1 rests internally against the ,closed outer end of the installation mandrel for axial support and, on the other hand, the end of the installation mandrel 2 on the motor side covers the commutator 4 externally so far axially that the brushes 1.1; 1.2, which are displaced axially over the external circumferential surface of the installation mandrel 2, have to carry out only a radial movement on reaching their axial final position according to FIG. 3, once the installation mandrel 2 has been pulled away axially in the opposite direction, in order to move into their contact-making position in operation with respect to the circumferential surface of the commutator 4, according to FIG. 4. According to an alternative refinement of the invention, which is preferably advantageous in the case of different axial lengths of the rotor shaft 5 or of the drive shaft 5.1, the outer end of the drive shaft 5.1 is located at a distance from the installation mandrel 2, which then rests in a supporting manner against the commutator 4, preferably against its commutator hooks 4.1, for axial support.

The restraining part 3, which is in the form of a disk, has axially projecting supports 3.1; 3.2, on which the brushes 1.1; 1.2 initially rest in a radially raised installation position.

Figure 2:
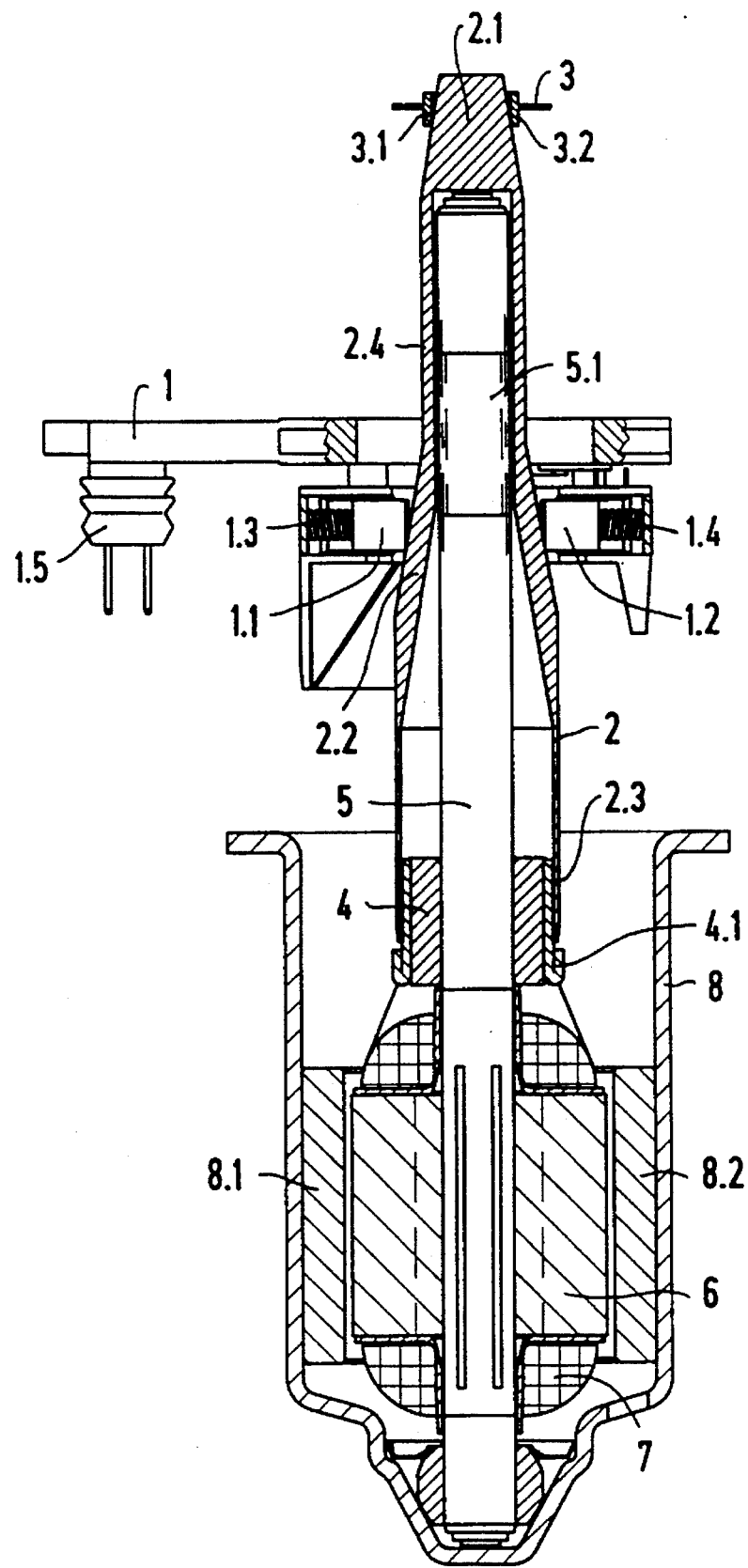

One end part 2.1 of the installation mandrel 2 is provided with a conical expansion in an advantageous manner, starting from its outer axial end, in such a manner that the restraining part 3, which is plugged onto one end part 2.1 by means of a corresponding central opening 3.7 and is held in a preinstalled manner in the brush holder 1, is fixed on the conical expansion while the brush holder 1 is being pushed further axially, being separated from the brush holder 1 according to FIG. 2.

In addition to the first conically expanded end part 2.1 for fixing c,f the restraining part 3, the installation mandrel 2, which is illustrated in FIGS. 1–3 and is constructed in the form of a sleeve according to an advantageous refinement of the invention, has on its end facing away from the motor, an adjacent, first cylindrical center part 2.4, which holds the projecting end of the rotor shaft 5 or of the drive shaft 5.1 preferably internally in a press fit, an adjacent, second conically expanded center part 2.2 for radially raising the brushes 1.1; 1.2, which rest on its circumferential surface, into their final installation position and, finally, a second cylindrical end part 2.3, which engages over the external circumference of the commutator 4, preferably with a press fit.

As a result of the installation according to the invention with the aid of an installation mandrel 2, the internal diameter of the central opening 3.1 of the restraining part 3 can be selected to be smaller than the external diameter of a rotor shaft 5 or drive shaft 5.1 which projects axially beyond the end of the commutator 4 and extends into the installation mandrel 2, which is in the form of a sleeve; in addition, the radial separation of the supports 3.1; 3.2 of the restraining part 3, which supports 3.1; 3.2 hold the brushes 1.1; 1.2 back in their installation position, can be selected in an advantageous manner to be smaller than the external diameter of the commutator 4 and, in consequence, reliable restraint can be achieved even in the case of a particularly compact construction, and a longer operating life of the brushes can be achieved as a result of using greater brush lengths with an installation size which is otherwise unchanged. This is possible because the restraining part 3 is not released by the commutator 4, which in this case is inserted into a central opening in the restraining part 3, whose internal diameter for this case would have to correspond at least to the external diameter of the commutator 4.

The brushes 1.1; 1.2 which are released by the supports 3.1; 3.2 of the restraining part 3 come to rest on the external circumferential surface of the installation mandrel 2 and are initially moved further over its cylindrical part 2.4 and are then, according to FIG. 2, raised radially a second time in the region of the second conically expanded center part 2.2 so far that they can subsequently, according to FIG. 3, move over the second cylindrical end part 2.3, which engages over the external circumference of the commutator 4, into their final axial position relative to the components, which are already located in their mutual final axial position, of the motor housing 8 with the exciter magnets 8.1, 8.2, on the one hand, and the rotor with the rotor shaft 5, commutator 4, rotor core 6 and rotor winding 7, on the other hand. When the installation mandrel 2 is subsequently pulled away axially, the brushes 1.1; 1.2 then move, under the pressure of the brush contact-pressure springs 1.3; 1.4, only in the radial direction into their final radial position in operation, in which they make contact with the circumferential surface of the commutator 4.

The method according to the invention by means of an installation mandrel 2 can be used advantageously irrespective of the type of pre-fixing of the restraining part 3 within the brush holder 1; the restraining part 3 can either be injection molded on a plastic brush holder 2, integrated in one piece, preferably via webs 3.3 to 3.6 which can be hocked out, or can be arranged in a preinstalled manner in the brush holder, as a separate part with a sliding fit.

The following successive method steps are provided in an expedient sequence of the installation process:

from its axial, open end, preferably on the drive side, a wound armature 4-7 having a rotor shaft 5 and/or drive shaft 5.1 and a commutator 4 is plugged into a motor housing 8 which is otherwise preinstalled;

the cylindrical other end part 2.3, which is in the form of a sleeve, of the installation mandrel 2 is plugged onto the commutator 4, the rotor shaft 5 or drive shaft 5.1 which projects axially beyond the commutator 4 in this case extending into the interior of the installation mandrel 2, which is constructed in the form of a sleeve.

The brush holder 1 is already plugged onto the conically expanded end part 2.1 of the installation mandrel 2 in advance or is now pushed onto this end part 2.1, the restraining part 3 in this case being clamped on the conical expansion of the first end part 2.1.

The brush holder 1 is pushed further axially in the direction of the commutator-side end of the motor, the brushes 1.1; 1.2 in this case resting on the circumferential surface of them installation mandrel 2.

The brushes 1.1; 1.2 are raised radially in the region of a conically expanded center part 2.2 until there is a radial separation corresponding to the external circumference of the other, cylindrical end part 2.3, which is in the form of a sleeve and is ]plugged onto the commutator 4, of the installation mandrel 2.

The brush holder 1 is displaced, with the brushes 1.1; 1.2, further along the installation mandrel 2 into its axial final operating position relative to the commutator 4.

The installation mandrel 2 is withdrawn, the brushes 1.1; 1.2 in this case moving only in the radial direction onto the commutator 4.

The motor housing 8 is completed in the region of its open side, on the commutator side.

What is claimed is:

1. A method for producing a commutator motor having a brush holder, on the stator side, in which brushes are guided and are pressed against a commutator such that they make contact, having the following method steps:

(a) the brushes are initially locked, by means of a restraining part, in a radially raised installed position;

(b) the restraining part is held in a preinstalled manner in the brush holder;

(c) before being installed on the stator side, the brush holder is placed onto one end part of an installation mandrel, the brushes remaining in an installed position, by resting on the circumferential surface of the installation mandrel, as a result of axial displacement of the restraining part;

(d) the installation mandrel is moved such that its other end part, which corresponds at least to the external diameter of the commutator, is in a coaxial position with respect to the commutator, and the brush holder with the brushes is subsequently moved, by further axial displacement along the installation mandrel, into its axial end position, in terms of operation, relative to the commutator;

(e) the installation mandrel is removed by axial withdrawal, the brushes sliding radially onto the commutator.

2. The method as claimed in claim 1, having the feature: the installation mandrel is constructed in the form of a sleeve and its other end part is plugged onto the commutator, covering the circumferential surface of said commutator, in order to displace the brush holder, with the brushes, into its final operating position.

3. The method as claimed in claim 1 having the feature: one end part of the installation mandrel is provided with a conical expansion in such a manner that the restraining part, which is plugged onto the one end part by means of a central opening, is fixed on the conical expansion while the brush holder is being pushed further axially, being separated from the brush holder.

4. The method as claimed in claim 3, having the feature: the internal diameter of the central opening of the restraining part is smaller than the external diameter of a rotor shaft or drive shaft which projects axially beyond the outer end of the commutator and extends into the installation mandrel, which is in the form of a sleeve.

5. The method as claimed in claim 1 having the feature: the restraining part is fixed on the installation mandrel axially outside the complete commutator motor.

6. The method as claimed in claim 1 having the feature: the installation mandrel is supported axially on the commutator by means of its other end part.

7. The method as claimed in claim 1 having the feature: the installation mandrel is supported on its one end part, preferably being plugged into the interior of its sleeve, on the rotor shaft or drive shaft.

8. The method as claimed in claim 1 having the feature: the radial distance between the supports of the restraining part for the brushes, which are raised in an installed position, is less than the external diameter of the commutator.

9. The method as claimed in claim 1, having the feature: the installation mandrel, which is preferably constructed in the form of a sleeve, is constructed for fixing the restraining part while the brush holder is being pushed on, having a first conically expanded end part on its end facing away from the motor, an adjacent, first cylindrical center part, which holds the projecting end of the rotor shaft or of the drive shaft preferably internally in a press fit, an adjacent, second conically expanded center part for radially raising the brushes into their final installed position, and, finally, having a second cylindrical end part, which engages over the external circumference of the commutator.

10. The method as claimed in claim 1 having the feature: the restraining part is held in a preinstalled manner in the brush holder, as a separate part with a sliding fit.

11. The method as claimed in claim 1 having the feature: the restraining part is integrated in one piece, is injection molded, preferably via webs which can be knocked out, on a plastic brush holder, preferably in the form of a plastic restraining disk, which is separated from the brush holder by means of the installation mandrel.

12. The method as claimed in claim 1 having the following successive method steps:
from its one axial, open end, preferably on the drive side, an armature having a rotor shaft and/or drive shaft and a commutator is plugged into a motor housing which is otherwise preinstalled;
the other end part, which is in the form of a sleeve, of the installation mandrel is plugged onto the commutator, the rotor shaft or drive shaft which projects axially beyond the commutator in this case extending into the interior of the installation mandrel, which is constructed in the form of a sleeve;
the brush holder is pushed onto the installation mandrel by the other end part of the installation mandrel, which other end part is preferably closed axially, the restraining part in this case being clamped on the conical expansion of the first end part;
the brush holder is pushed further axially in the direction of the commutator-side end of the motor, the brushes in this case resting on the circumferential surface of the installation mandrel;
the brushes are raised radially in the region of a conically expanded center part until there is a radial separation corresponding to the external circumference of the other end part, which is plugged onto the commutator, of the installation mandrel;
the brush holder is displaced, with the brushes, further along the installation mandrel into its axial final operating position relative to the commutator,
the installation mandrel is withdrawn, the brushes in this case moving only in the radial direction onto the commutator;
the motor housing is completed in the region of its open side, on the commutator side.

* * * * *